United States Patent [19]

Eichfeld et al.

[11] Patent Number: 5,422,979

[45] Date of Patent: Jun. 6, 1995

[54] FUZZY LOGIC CONTROLLER WITH OPTIMIZED STORAGE ORGANIZATION

[75] Inventors: Herbert Eichfeld; Michael Löhner, both of München, Germany

[73] Assignee: Siemens Aktiengesellschaft, Munich, Germany

[21] Appl. No.: 204,318

[22] Filed: Mar. 7, 1994

[30] Foreign Application Priority Data

Sep. 11, 1991 [DE] Germany .................... 41 30 212.5

[51] Int. Cl.⁶ .............................................. G06F 7/60
[52] U.S. Cl. ............................................ 395/3; 395/51; 395/61; 395/900
[58] Field of Search ...................... 395/3, 61, 900, 51

[56] References Cited

U.S. PATENT DOCUMENTS

| | | | |
|---|---|---|---|
| 4,875,184 | 10/1989 | Yamakawa | 395/3 |
| 5,073,863 | 12/1991 | Zhang | 395/3 |
| 5,167,005 | 11/1992 | Yamakawa | 395/3 |
| 5,184,131 | 2/1993 | Ikeda | 395/3 |
| 5,261,036 | 11/1993 | Nakano | 395/61 |

FOREIGN PATENT DOCUMENTS

| | | | |
|---|---|---|---|
| 0471843 | 2/1992 | European Pat. Off. | G06F 9/44 |
| 2635884 | 3/1990 | France | G06F 7/60 |
| 63-113732 | 5/1988 | Japan | G06F 9/44 |

OTHER PUBLICATIONS

VLSI Fuzzy Chip and Inference Accelerator Board Systems Watanabe et al. May 26, 1991 IEEE.

"A VLSI Fuzzy Logic Controller With Reconfigurable Cascadable Architecture", H. Watanabe et al, IEEE Journal of Solid-State Circuits, vol. 25, No. 2, Apr. 1990, pp. 376-382.

*Primary Examiner*—Allen R. MacDonald
*Assistant Examiner*—Richemond Dorvil
*Attorney, Agent, or Firm*—Hill, Steadman & Simpson

[57] ABSTRACT

In a fuzzy logic controller, numbers (NI) for linguistic values of the input signal (I1) and first and further parts of input relevance functions (ZL, ZH) of the input signal (I1) can be stored per input signal (I1 . . . I4) in an input memory (I1MEM . . . I4MEM). The numbers for the linguistic values can be fed directly and via incrementing devices (INC1 . . . INC4) to a regulating decoder (RDEC) through a number multiplexer (MUX1a . . . MUX4a), the regulating decoder supplying addresses for a downstream output memory (OMEM). An output signal of the output memory (OMEM) can be fed directly and the first and further parts of the input relevance functions can be fed via relevance function multiplexers (MUX1b . . . MUX4b) to a minimum/maximum circuit (MINMAX). The fuzzy logic controller is distinguished in particular by a very low storage space requirement and is therefore suitable in particular for fuzzy logic controllers with on-chip memories.

6 Claims, 3 Drawing Sheets

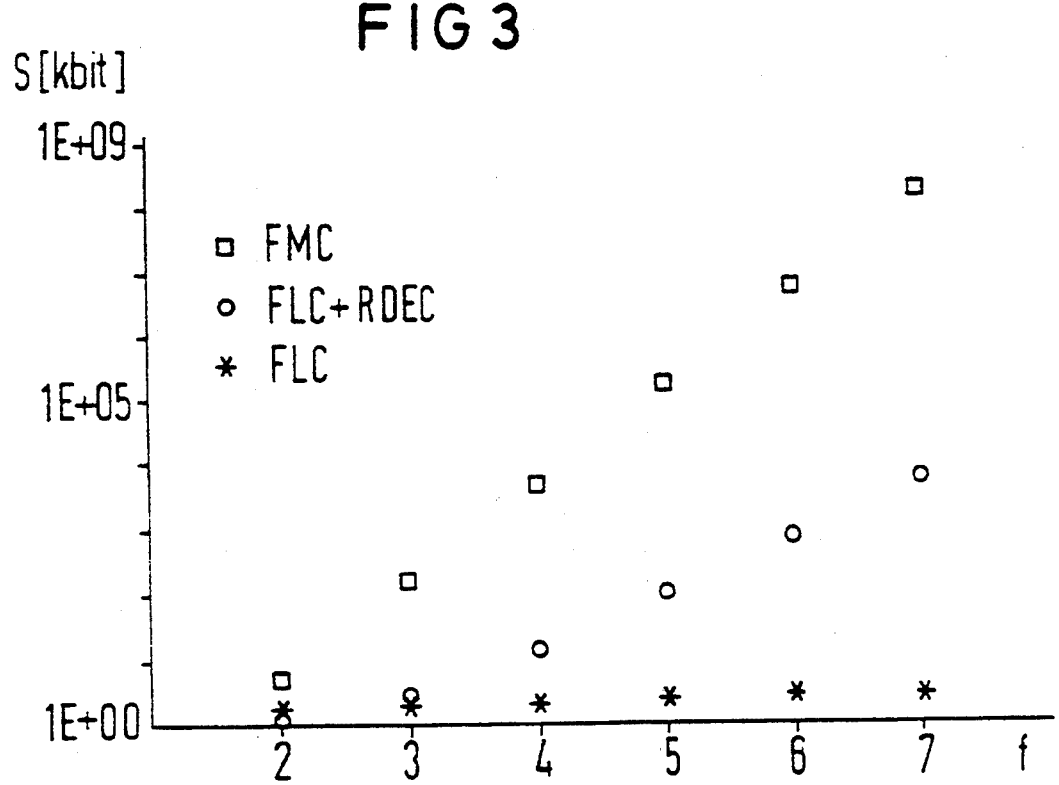

FUZZY LOGIC CONTROLLER WITH OPTIMIZED STORAGE ORGANIZATION

BACKGROUND OF THE INVENTION

The present invention relates to a fuzzy logic controller having a regulating memory for fuzzification, a regulating decoder and a minimum/maximum circuit for inference formation and a defuzzification circuit downstream of the minimum/maximum circuit.

A fuzzy logic controller of the generic type is known, for example, from the publication by Watanabe entitled "A VLSI Fuzzy Logic Controller with Reconfigurable, Cascadable Architecture" from the IEEE Journal of Solid-State Circuits, Vol. 25, No. 2, April 1990, pages 376 to 382. The controller concerned is a fuzzy logic controller which may have an on-chip memory, the on-chip memory requiring a relatively large amount of storage space and consequently of chip surface area.

SUMMARY OF THE INVENTION

The invention is thus based on the object of specifying a fuzzy logic controller which, on account of its logic, allows optimized storage organization and, as a result, less storage space is required. This object is achieved according to the invention by the following features.

The regulating memory has f input memories and an output memory. In each case an input signal can be fed via a respective buffer/decoding circuit to a respective input of an input memory, the input signals having an input resolution e and it being possible to form by the buffer/decoding circuits in each case $2^e$ addresses for the respective input memory. Numbers for a respective freely selectable address range of a respective input signal, having a plurality of linguistic values, and function values of a first and h−1 further input relevance functions of the respective address range are stored in the respective input memories, h representing the degree of overlap of the input assignment functions. In each case the number for a first relevant linguistic value, from the selected address range, of a respective input signal is fed directly and numbers for further relevant linguistic values, from the selected address ranges, are fed via a respective incrementing device to inputs of a respective number multiplexer and are switched through by the latter successively in dependence on a respective multiplexer control signal to a respective input of the regulating decoder. Successively the function values of a first and of h−1 further input relevance functions are fed in dependence on the respective multiplexer control signal for a respective relevance function multiplexer to a minimum operation of the minimum/maximum circuit. Numbers for linguistic values of an output signal can be assigned by the rules stored in the regulating decoder from the numbers for the relevant linguistic values of the input signal. These numbers serve as addresses for a downstream output memory, which contains values for relevance functions of the output signal and which for its part is connected by an output via an output multiplexer on the input side to the minimum operation of the minimum/maximum circuit.

The advantage which can be achieved by the invention is, in particular, that, on account of the low storage requirement, the memories needed can be realized without any problem on the semiconductor chips of the fuzzy logic controller.

Further development and advantages of the present invention are as follows. The degree of overlap is h=2, in that both the number multiplexers and the relevance function multiplexers are designed in the form of 1-of-2 multiplexers. The multiplexer control signals are in each case only one bit wide. In the incrementing devices there is respectively formed from the number for the first relevant linguistic value from the selected address range of the respective input signal, by addition of a one, in each case merely a number for a further relevant linguistic value from the selected address range of the respective input signal.

The minimum/maximum circuit has f+1 inputs, which at the same time represent the inputs of a minimum operation. One output of the minimum operation is connected to a first input of a maximum operation and an output signal of the maximum operation is delayed by means of a delay flipflop and subsequently is fed via a first AND gate to a second input of the maximum operation or via a second AND gate to the defuzzification circuit.

The regulating decoder is constructed in the form of a memory.

The fuzzy logic controller is located together with the regulating memory on a common semiconductor chip. The fuzzy logic controller is further located together with a conventional multipurpose controller on a common semiconductor chip.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 shows a diagram for representing the storage space requirement in dependence on the number of inputs, for various fuzzy controllers.

DESCRIPTION OF THE PREFERRED EMBODIMENT

Figure 1:
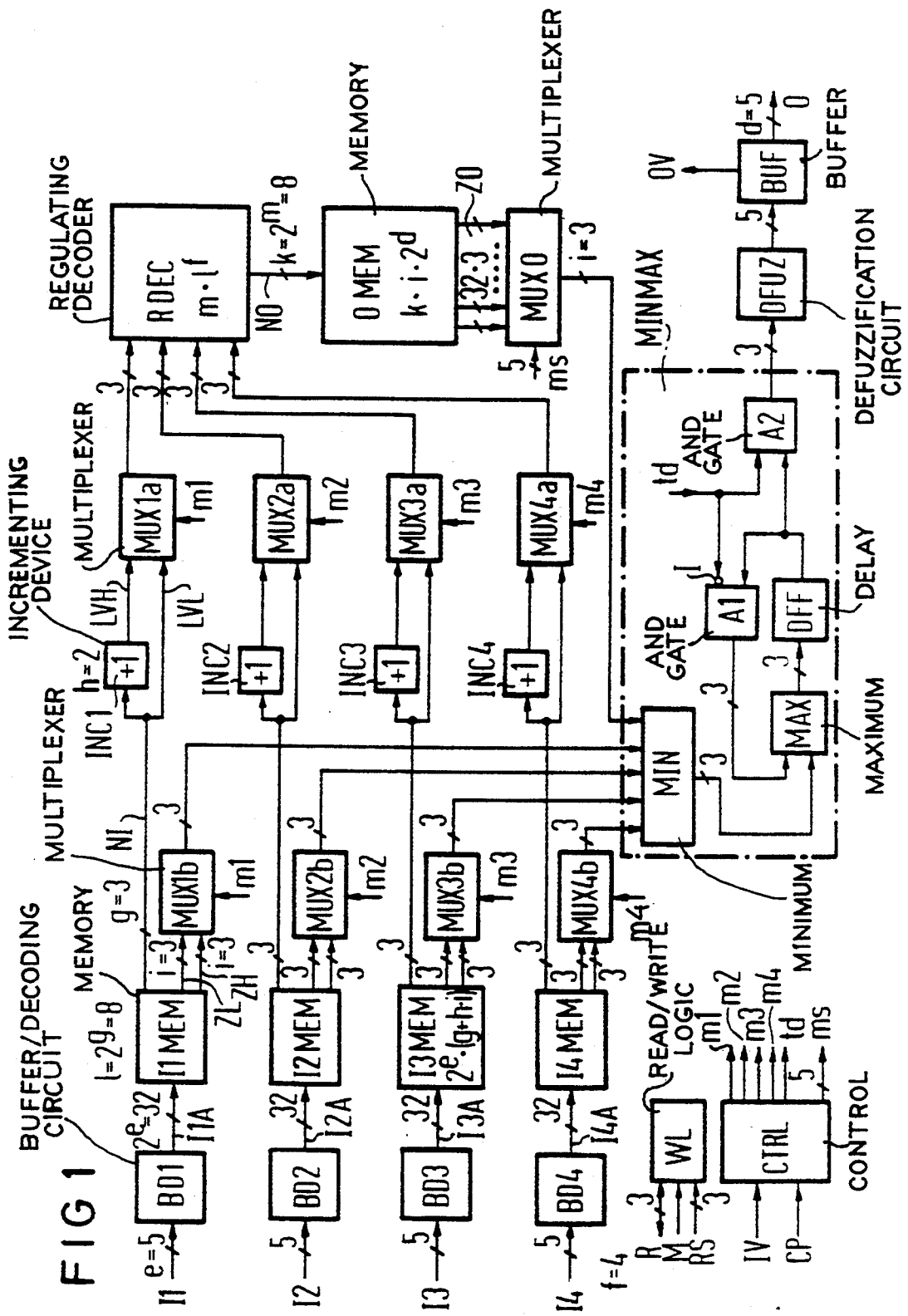
FIG. 1 shows a circuit diagram of a fuzzy logic controller according to the invention.
Figure 2A:
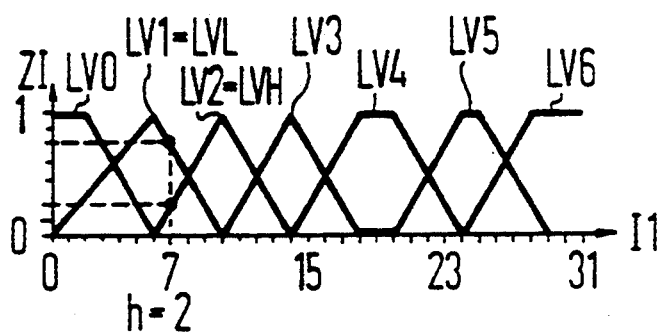
FIGS. 2a to 2d show input relevance functions, numbers for the input relevance functions and parts of relevance functions, in the case of a fuzzy logic controller according to FIG. 1.

In FIG. 1 a fuzzy logic controller according to the invention with f=4 inputs for input signals I1 ... I4 and an output for an output signal 0 is represented, the inputs having an input resolution g=5 and the output having an output resolution e=5 bits. The input for the signal I1 is connected to inputs of a buffer/decoding circuit BD1, which on the output side supplies $2^e=32$ addresses for an input memory I1MEM. In the input memory I1MEM, numbers NI of linguistic values of an input signal I1, first parts ZL of input relevance functions of the input signal I1, and further parts ZH of input relevance functions of the input signal I1 can be stored. The resolution of the parts ZL and ZH of the input relevance functions is in this case i=3 bits. The numbers NI available at the output of the input memory I1MEM can in this case be fed directly whenever for a first relevant linguistic value LVL of I1 and numbers for further relevant linguistic values LVH of I1 can be fed via an incrementing device INC1 to inputs of a number multiplexer MUX1a and can be switched through by the latter alternatively in dependence on a respective multiplexer control signal m1 to a respective input of a regulating decoder RDEC. If the degree of overlap of the input relevance functions of I1, as represented in FIGS. 1 and 2a, is h=2, the number of the further relevant linguistic value LVH in the incrementing device INC1 becomes NI+1. The number multiplexer MUX1a in this case comprises a 1-of-2 multiplexer and the multiplexer drive signal m1 is in this case only one bit wide. At further outputs of the input memory I1, the first parts ZL and h−1=1 further parts ZH of the input relevance functions are available and can be fed to a relevance function multiplexer MUX1b. The relevance function multiplexer MUX1b in this case likewise comprises a 1-of-2 multiplexer, which similarly can be driven by the multiplexer control signal m1. One output of the relevance function multiplexer MUX1b is connected to an input of a minimum/maximum circuit MINMAX. In a corresponding way, the inputs for the input signals I2 . . . I4 are connected via buffer/decoder circuits BD2 . . . BD4 and input memory circuits I2MEM . . . I4MEM, through incrementing circuits INC2 . . . INC4 and number multiplexers MUX2a . . . MUX4a to the regulating decoder RDEC and through relevance function multiplexers MUX2b . . . MUX4b to inputs of the minimum/maximum circuit. The regulating decoder RDEC usually comprises a fixed wiring, but to increase the flexibility may comprise a memory in the form of a RAM or PROM etc. By means of the regulating decoder RDEC, numbers NO of linguistic values of the output signal can be formed in the form of addresses for a downstream output memory OMEM. With the aid of an output multiplexer MUXO, it is possible to select from $2^d=32$, three-bit-wide memory outputs, through a five-bit-wide multiplexer control signal ms a three-bit wide output signal successively in each case and feed it to an input of the minimum/maximum circuit. The storage capacity of an input memory I1MEM per input is here $2^e * (g+h * i) = 2^5 * (3+2 * 3) = 288$ bits. Given k=8 linguistic values of an output signal, the storage capacity of the output memory OMEM is $k * i * 2^d = 8 * 3 * 2^5 = 768$ bits. If, as mentioned at the beginning, the regulating decoder RDEC is implemented in the form of a memory, the storage capacity becomes $m * 1^s = 3 * 8^4 = 12,288$ bits, m denoting the resolution of the k=8 linguistic values of the output signal and l=8 denoting linguistic values of the input signal.

The minimum/maximum circuit MINMAX has f+1 inputs, which are connected to outputs of the relevance function multiplexers MUX1b . . . MUX4b and to the output of the output multiplexer MUXO and at the same time represent inputs of a minimum operation MIN. One output of the minimum operation MIN is connected to a first input of a maximum operation MAX and an output signal of the maximum operation can be delayed by means of a delay flipflop DFF and subsequently can be fed via a first AND gate A1 either to a second input of the maximum operation MAX or via a second AND gate A2 to a defuzzification circuit DFUZ. The AND gate A1 can in this case be actuated by means of an inverter I and the second AND gate can be actuated directly by a defuzzification clock signal td. The defuzzification circuit DFUZ operates, for example, by the usually customary center-of-gravity method and is wired on the output side to an input of an output buffer, which supplies the output signal 0 and a signal OV for the confirmation of a valid output signal. Furthermore, the fuzzy logic controller according to the invention has a read/write logic WL, which can be activated by a signal M and permits reading or writing of the relevance functions from or to the input memories I1MEM . . . I4MEM and from or to the output memory OMEM by a bidirectional regulating bus R. With the aid of a regulating selection signal, memory areas of the input memories and of the output memory can be addressed, whereby, in addition to relevance functions of the output signal, numbers NI and parts of relevance functions ZL, ZH of input signals can be written to the regulating bus R or read. In a control unit CTRL, the multiplexer control signals m1 . . . m4, the control signal ms for the output multiplexer and the defuzzification clock signal td can be formed from a signal IV for the confirmation of valid input signals and a clock signal CP.

Figure 2B:
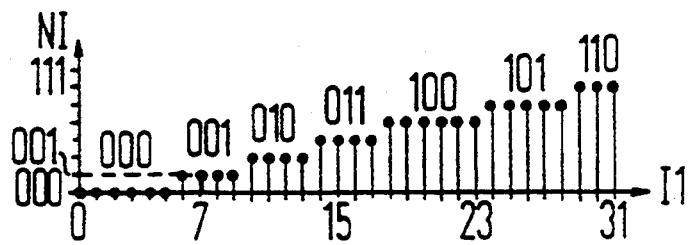

As soon as the signal IV for the confirmation of valid input signals is present, addresses I1A . . . I4A between 0 and 31 are formed from the signals at the inputs for the input signals I1 to I4 at the input of each of the four input memories I1MEM . . . I4MEM. In FIG. 2a, for example seven linguistic values LV0 . . . LV6 of the input signal I1 are represented with their relevance functions. Given a degree of overlap h=2, for I1=7, the linguistic variables LV1 and LV2 are concerned and supply in each case a relevance value. In this case, the first relevant linguistic value is LVL=LV1 and the other relevant linguistic value is LVH=LV2. If for each linguistic value of an input signal an associated input relevance function were stored in a memory area of its own, in this example $2^e * i * 1 = 2^5 * 3 * 8 = 768$ bits would be necessary per input signal for an input memory. In the case of the fuzzy logic controller according to the invention, however, far less storage space is required on account of the special storage organization, as described at the beginning. For this purpose, the linguistic values LV0 . . . LV6 represented in FIG. 2a are assigned the numbers NI, as represented in FIG. 2b. The assignment is performed in this case such that, for example, given an input signal I1=0 to 5, the linguistic value LV0 assumes the numbers NI=000, because for I1=0 to 5 the value of the input relevance function ZI of the linguistic value LV0 is greater than zero. In a corresponding way, the linguistic values LV1 to LV6 are also assigned to the numbers 001 . . . 110 with a resolution of g=3 bits for an input signal I1=6 to 31.

Figure 2C:
Figure 2D:
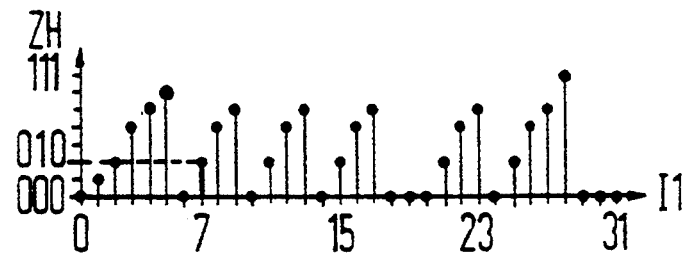

From the input relevance functions ZI of the input signal I1 with the degree of overlap h=2, a first part ZL of relevance functions of the input signal I1 and h−1=1 further parts ZH of relevance functions of the input signal I1 are formed with a resolution i=5 bits, the first part ZL and the further part ZH being free from overlap. The values for ZL and ZH are in this case assigned such that, for example, an input signal I1=7 is formed with the aid of the assignment function of the linguistic variable LV1, which represents the first relevant linguistic value LVL, and the value of, for example, 101 is entered at the address I1A=7 in the memory area for the first part ZL, as represented in FIG. 2c. Correspondingly, at the address I1A=7 for example a value 010 is formed with the aid of the linguistic value LV2, which represents the further relevant linguistic value LVH, and, as represented in FIG. 2d, is assigned to a memory area for the further part ZH. In this example with h=2, the memory area is thus described for the first part ZL with the constant or falling parts of the input relevance function ZI of the input signal I1 and the further part ZH with the rising parts of the input relevance functions ZI of the input signal I1. In a general case, given a degree of overlap h, correspondingly h memory areas for parts of relevance functions ZL, ZH are to be provided. In order to evaluate all $f^h=4^2=16$ possible combinations of relevant linguistic values LVL, LVH, a number multiplexer, for example MUX1$a$, and a relevance function multiplexer, for example MUX1$b$, are always successively switched over in pairs, so that the number NI is switched through representatively for the first relevant linguistic value LVL and the number NI+1 is switched through representatively for the further relevant linguistic value LVH to the regulating decoder RDEC. In the regulating decoder RDEC, numbers NO of linguistic values of the output signal are formed from these numbers, by the rules stored in the regulating decoder, in the form of addresses for the output memory OMEM, which then, in a way similar to in the case of the input memories, feeds one of $2^d=2^5=32$ output values via the output multiplexer MUXO with a resolution of i=3 to the minimum operation MIN. If the value from the output multiplexer MUXO is less than one of the values from the relevance function multiplexers MUX1$b$ . . . MUX4$b$, which are likewise fed to the minimum operation, this value is fed to the maximum operation MAX, and in the other case the respective value of the relevance function from the respective relevance function multiplexers is fed to said maximum operation MAX. As a result, a so-called "truncating" of the respective relevance function is effected. The defuzzification clock signal td remains zero until the multiplexers MUX1$a$ . . . MUX4$b$ have once been switched over respectively in pairs by the multiplexer control signals m1 . . . m4, whereby the first AND gate A1 remains open and, with the aid of the maximum operation MAX and the delay flipflop DFF, a maximum value can be determined from all the "truncated" relevance functions of the output variable for one of the 32 output addresses and, as soon as the defuzzification clock signal becomes td=1, can be transferred via the second AND gate A2 to the defuzzification circuit DFUZ. This is repeated for a total of $2^d=2^5=32$ output addresses and a value is determined from these 32 values in the defuzzification circuit DFUZ, for example by the usually customary center-of-gravity method, which value is subsequently transferred into the output buffer BUF and is available at the output 0 as soon as the signal OV for confirmation of the valid output signal is present.

If, for example, the input signal I1 were to have linguistic values of which the input relevance functions have a degree of overlap of h=3, there would be required in the input memory I1MEM memory areas for h=3 parts of input relevance functions, the relevance function multiplexer MUX1$b$ in the form of a 1-of-3 multiplexer with a two-bit-wide drive signal m1, an incrementing device INC1, which forms both the number NI+1 and a number NI+2, and a number multiplexer MUX1$a$ in the form of a 1-of-3 multiplexer, which likewise can be actuated by a two-bit-wide multiplexer drive signal m1. It is, moreover, conceivable that each input signal has different degrees of overlap and/or that the input resolution e is different from the output resolution d.

In FIG. 3, finally, the required storage capacity S is represented in a comparative diagram in kilobits in dependence on the number of inputs f. In this case, a fuzzy memory controller FMC, a fuzzy logic controller according to the invention with a regulating decoder implemented as a memory, FLC+RDEC, and a fuzzy logic controller FLC according to the invention, with a hard-wired regulating decoder, are compared. A fuzzy memory controller is to be understood as a memory with f * e=4 * 5=20 input addresses and an output word width d=5 bits, the storage capacity of which in the example is $S=d * 2^{f*e}=5 * 2^{4*5}=$about 5 megabits. Even if the regulating decoder RDEC is implemented as a memory, it is shown that, in particular given a relatively large number of inputs, there is a storage requirement S which is several orders of magnitude less than in the case of a fuzzy memory controller FMC. If the regulating decoder is hard-wired, there is an extremely low storage space requirement S even for a large number of inputs, since the storage space requirement S depends only linearly on the number of inputs.

On account of the low storage space requirement, in particular in the case of a hard-wired regulating decoder RDEC, fuzzy logic controllers according to the invention with on-chip memories can be produced relatively easily in themselves, but also as an addition for conventional multipurpose controllers.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A fuzzy logic controller, comprising: a regulating memory for fuzzification connected to a regulating decoder and a minimum/maximum circuit for inference formation and a defuzzification circuit connected downstream of the minimum/maximum circuit; the regulating memory having f input memories and an output memory, for each input memory an input signal being fed via a respective buffer/decoding circuit to a respective input of a respective input memory; each input signal having an input resolution e and each buffer/decoding circuit forming $2^e$ addresses for the respective input memory; a respective input memory of the f input memories having stored numbers for linguistic values of a respective input signal and function values of a first and h−1 further input relevance functions, h representing a degree of overlap of input assignment functions; for each input memory a number for a first relevant linguistic value of a respective input signal being fed directly and numbers for further relevant linguistic values of the respective input signal being fed via a respective incrementing device to inputs of a respective number multiplexer and being successively switched through by the respective number multiplexer in dependence on a respective multiplexer control signal to a respective input of the regulating decoder; the function values of a first and of h−1 further input relevance functions being successively fed in dependence on the respective multiplexer control signal via a respective relevance function multiplexer to a minimum operation element of the minimum/maximum circuit; and numbers for linguistic values of an output signal being assigned by rules stored in the regulating decoder from numbers for the relevant linguistic values of the respective input signal and these numbers for linguistic values of an output signal serving as addresses for a downstream output memory that is connected to the regulating decoder, said downstream memory containing values for relevance functions of the output signal and said downstream memory having an output connected via an output multiplexer to the minimum operation element of the minimum/maximum circuit.

2. The fuzzy logic controller as claimed in claim 1, wherein the degree of overlap is $h=2$, wherein each number multiplexer and each relevance function multiplexer are 1-of-2 multiplexers and the respective multiplexer control signals are only one bit wide and wherein in each of the incrementing devices there is respectively formed from the number for the first relevant linguistic value of the respective input signal, by addition of a one, only a number for a further relevant linguistic value from the selected address range of the respective input signal.

3. The fuzzy logic controller as claimed in claim 1, wherein the minimum/maximum circuit has $f+1$ inputs, which are also inputs of the minimum operation element and wherein one output of the minimum operation is connected to a first input of a maximum operation element and an output signal of the maximum operation element, is delayed by means of a delay flipflop and subsequently is fed via a first AND gate to a second input of the maximum operation element or via a second AND gate to the defuzzification circuit.

4. The fuzzy logic controller as claimed in claim 1, wherein the regulating decoder is a memory.

5. The fuzzy logic controller as claimed in claim 1, wherein the fuzzy logic controller is located together with the regulating memory on a common semiconductor chip.

6. The fuzzy logic controller as claimed in claim 1, wherein the fuzzy logic controller is monolithically integrated with a conventional multipurpose controller.

* * * * *